J. ROEVER.
SPRING BED.
APPLICATION FILED APR. 18, 1914.
1,126,869.
Patented Feb. 2, 1915.
5 SHEETS—SHEET 1.
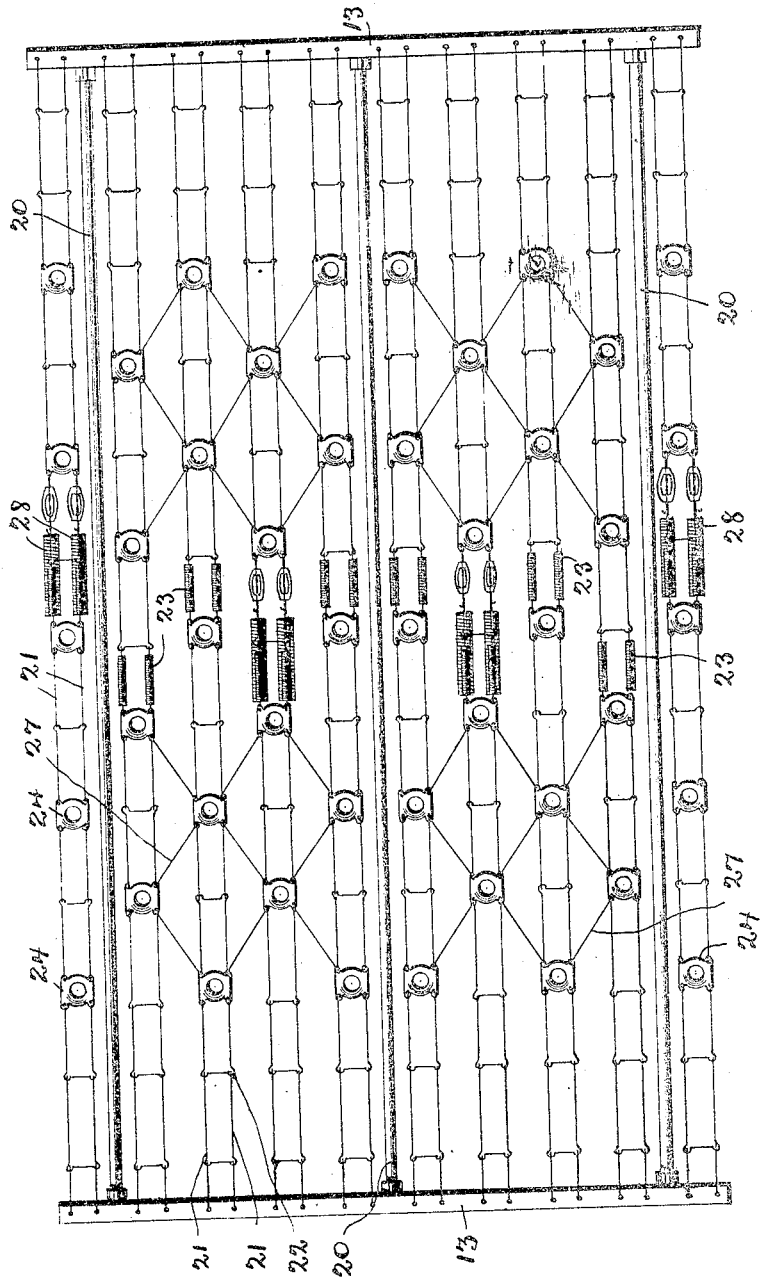

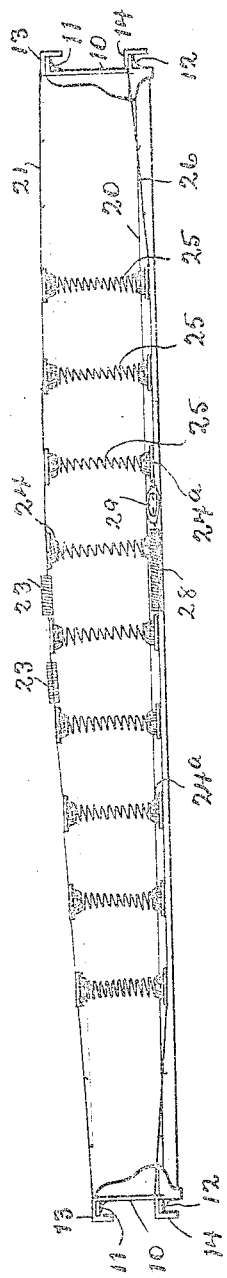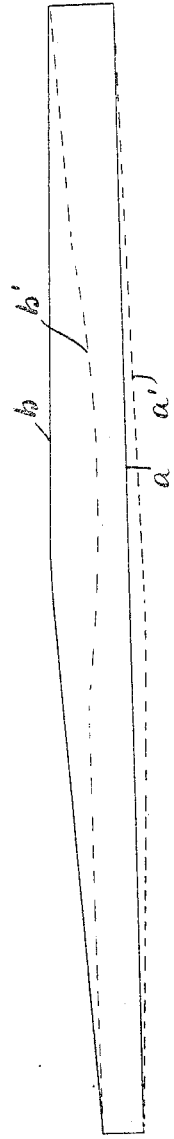

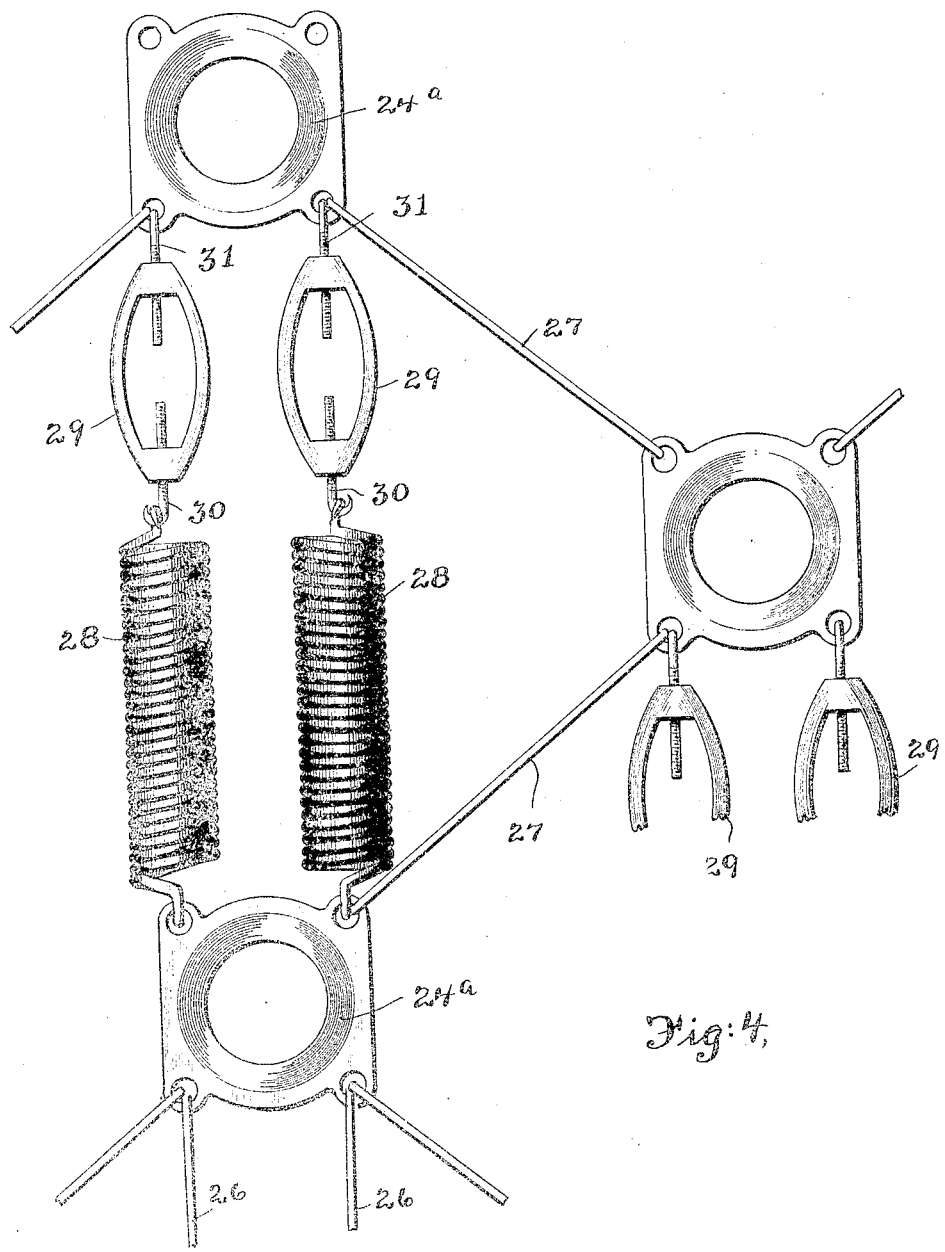

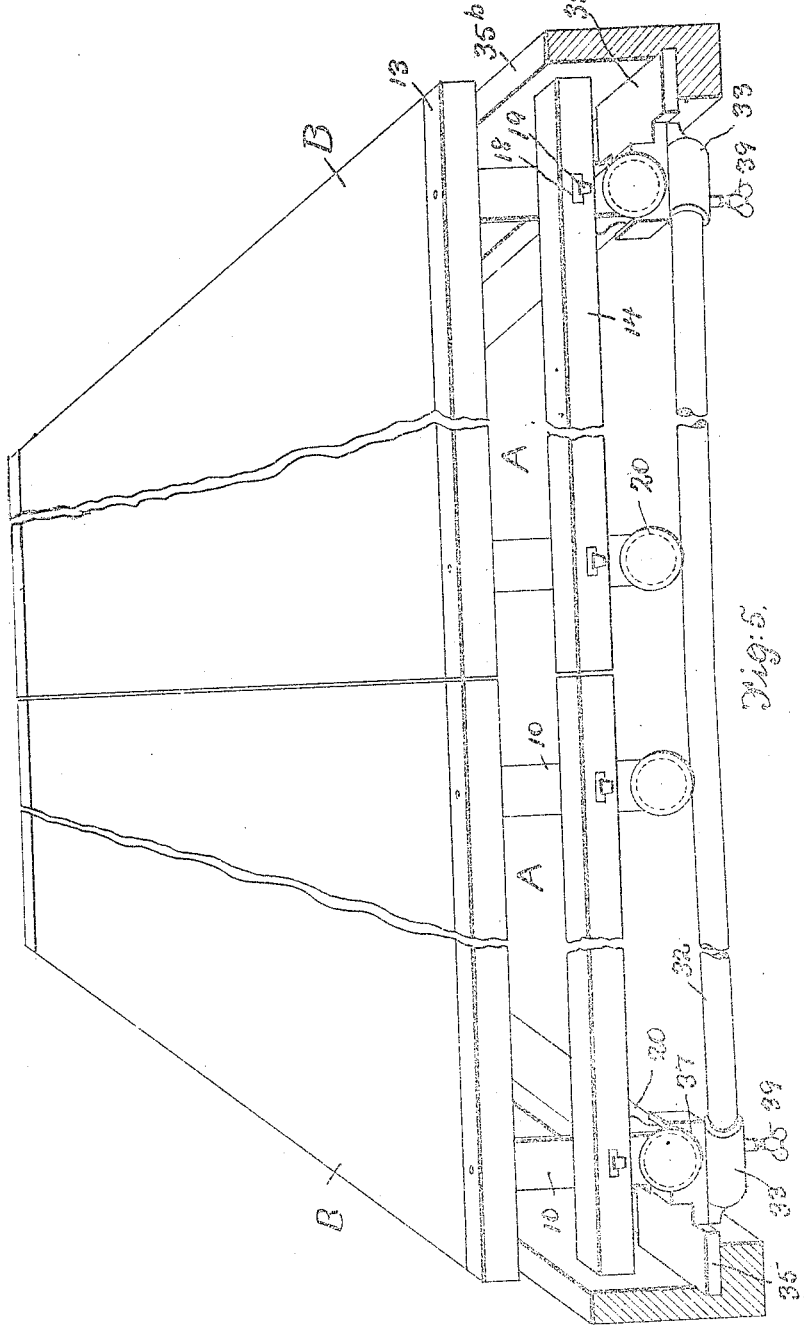

J. ROEVER.
SPRING BED.
APPLICATION FILED APR. 18, 1914.
1,126,869.
Patented Feb. 2, 1915.
5 SHEETS—SHEET 5.
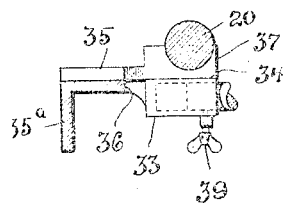
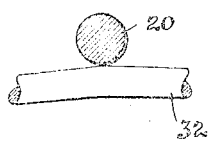
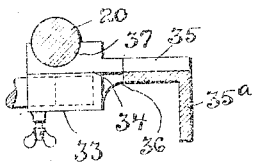
Fig. 6.
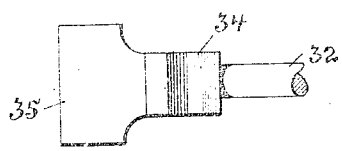
Fig. 7.
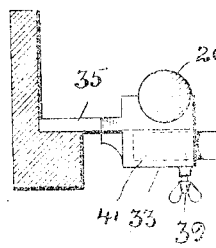
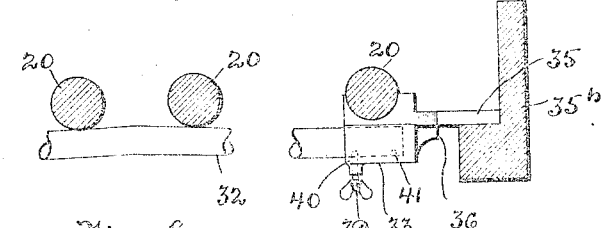
Fig. 8.
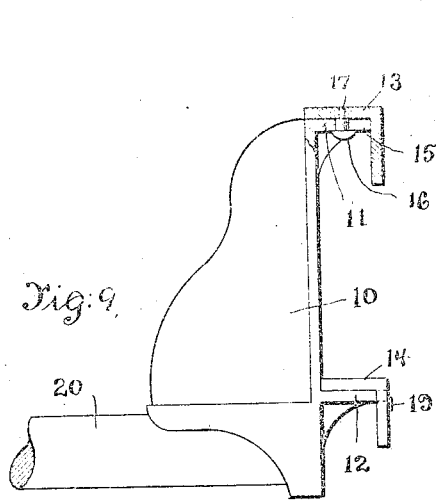
Fig. 9. Fig. 10. Fig. 11.
Witnesses:
Julius Roever, Inventor,
By his Attorney,
W. B. Hutchinson.

ID

UNITED STATES PATENT OFFICE.

JULIUS ROEVER, OF NEW YORK, N. Y.

SPRING-BED.

1,126,869.

Specification of Letters Patent.

Patented Feb. 2, 1915.

Application filed April 18, 1914. Serial No. 832,677.

*To all whom it may concern:*

Be it known that I, JULIUS ROEVER, a citizen of the United States, and a resident of the city of New York, county of Queens, and State of New York, have invented a new and useful Improvement in Spring-Beds, of which the following is a full, clear, and exact description.

My invention relates to improvements in spring beds, and the object of my invention is to produce a simple and unusually resilient spring bed, which is also sufficiently strong.

In carrying out my invention I form the bed top of a series of flexible jointed straps having spiral springs forming a part of the straps, these being spaced apart from the ends of the bed, and the top is supported by vertical spiral springs which in turn rest on the bed bottom. This bed bottom is formed of flexible straps like the top, with spiral springs forming a part of the straps, but with such springs of greater tension than the springs in the bed top, and I further make this tension adjustable by providing the bottom straps with turnbuckles. In this way I can make the bottom straps as stiff as need be, or as flexible as desired, and it will be seen that the tension of the top is likewise regulated because the top springs which are longitudinal of the bed, are of less tension than the bottom springs, and both top and bottom springs yield with the vertical springs when a weight is placed upon the bed. The above arrangement makes it possible to adjust the bed so as to exactly suit any desired weight, and to further provide for the comfort of the user, I preferably make the head of the bed slightly higher than the foot, and adjust the tension of the bottom springs so that the top of the bed is slightly convex when no one lies upon it, and this causes it to assume a level or essentially level shape when a weight is placed on the bed.

My present invention is an improvement on the structure shown in my application for Letters Patent of the United States for improvement in spring beds, Serial No. 791,908, filed September 26, 1913, and allowed February 20, 1914.

Reference is to be had to the accompanying drawings forming a part of this specification, in which similar reference characters indicate corresponding parts in all the views.

Figure 1 is a top plan view of the bed forming my invention, some of the bottom parts being omitted for the sake of clearness. Fig. 2 is a side elevation of the bed. Fig. 3 is a diagrammatic view of the bed under stress. Fig. 4 is an enlarged detail plan of a portion of the bed bottom. Fig. 5 is an end view of the bed when the springs are covered and the bed adjusted to a wooden bedstead. Fig. 6 is a broken diagrammatic cross section showing the manner in which the bed is supported on an iron bedstead. Fig. 7 is a plan of one of the brackets of a cross-bar which supports the bed, the cross-bar being shown in connection with the brackets. Fig. 8 is a diagrammatic cross section showing the manner in which the bed is supported on a wooden bedstead. Fig. 9 is an enlarged detail view, partly in section, showing one of the brackets of the bed. Fig. 10 is a broken plan view of the structure shown in Fig. 9, but with the top rail removed from the supporting bracket, and Fig. 11 is a broken detail end view showing the manner in which the bottom rail of the frame connects with the brackets above referred to.

The end frames of the bed are formed by brackets 10, which are vertically arranged and spaced apart, the bracket being shown best in Fig. 9. The brackets at each end are provided near the top and bottom with outwardly projecting ledges 11 and 12, and the several brackets are spaced apart and also fastened together by angle rails 13 and 14, as shown clearly in Figs. 2 and 9. For convenience in assembling the parts the top flange 11 of each bracket is slotted from the outer side inward as shown at 15, to receive the shank of a rivet 16 which has a reduced end 17 fastened in the top or horizontal portion of the rail 13. The rail with the rivets is assembled by sliding the shanks of the rivets into the slots 15 aforesaid, and then the rivets can be tightened so as to hold the parts firmly together. The lower rail 14 might be similarly fastened, but I have shown it provided with slots 18 (see Fig. 11) in the vertical part of the rail, and each slot receives a tongue 19 projecting from the ledge 12 of the adjacent bracket, and as the tongue is a malleable casting it can be bent down and clenched as shown in the drawings, thus holding the rail in place.

The end frames, the construction of which has just been described, are spaced apart and connected together by longitudinal bars 20, any desired number of these being used, but usually I employ three bars in a full sized bed, and two bars in a smaller bed.

The top surface of the bed is comprised of a series of flexible straps made up of wires 21 arranged in pairs and jointed together as shown at 22, the straps being hooked to the flanges 13 at the end frames of the bed, and having preferably near the central part of the bed, extensible springs 23 which form a part of the straps. The straps also are provided at intervals with saddles 24 which form a means of connection with the vertical springs 25 (see Fig. 2), and these connect at the bottom with saddles 24ª like the saddles 24 already referred to, and the bottom saddles are supported on the bottom straps 26 of the bed, these bottom straps being like the top straps already described, and being connected at the ends with the lower rails 14 of the bed. The top and bottom straps are both braced by the diagonally arranged ties 27 which connect the several saddles 24 and the saddles 24ª.

The bottom straps 26 are provided with spiral springs 28 which are longitudinally arranged, and which are considerably heavier than the springs 23 of the top straps. These bottom straps are also provided with turnbuckles 29, which can be conveniently connected with the springs 28 by screw hooks 30 as shown in Fig. 4, and which can connect by screw hooks 31 with the saddles 24ª. It will thus be seen that the turnbuckles and springs 28 form a part of the bottom straps. It will be readily seen that by means of these turnbuckles the tension of the springs 28 can be nicely regulated, and that the tension of the bed as a whole can be similarly regulated. It will also be noticed that the springs 28 are preferably arranged beneath the springs 23, but in the drawing, Fig. 1, I have omitted some of the springs 28 and turnbuckles 29, to avoid confusing the drawing.

As the lower flexible portion of the bed is stiffer than the top flexible portion, and as these parts are connected by the spiral springs 25, it will be readily seen that the top will yield more than the bottom, but that both will yield vertically and adapt the bed to its load. Referring to Fig. 3, let *a* represent the normal level of the bed bottom, and *b* the normal level of the bed top. Now when a sufficient weight is placed on the bed top, both top and bottom will be deflected downward, but the top will yield much more than the bottom, and in such case the dotted line $a^1$ will represent the deflected position of the bottom, and the dotted line $b^1$ the deflected position of the top. The construction referred to makes the bed extremely resilient, and yet it is very strong.

In Fig. 5 I have shown a wooden bedstead, and in this construction I preferably make a full bed in two parts A, and in the drawing, Fig. 5, they are shown as covered with a covering B.

The following means is preferably used for supporting the bed and adapting it both to metal bedsteads and wooden bedsteads. Referring to Figs. 6 to 8, I provide near the head and foot of the bed, cross-bars 32 to support the bed, each bar being preferably convex in the center as shown in the drawings, and at the ends the cross bar enters sockets 33 in the brackets 34, each bracket having a flat end ledge 35 adapted to lie on the rail 35ª of a metal bedstead, or 35ᵇ of a wooden bedstead. The bracket has also a shoulder 36 adapted to abut with the inner edge of the rail 35ª, and has at the top a socket 37 in which the bed-bar 20 can securely lie. The wooden bedsteads are generally narrower than the metal bedsteads, and so the cross-bar 32 is adjustable to make it fit either kind of bedstead. To provide for this, the socket 33 has holes 40 and 41 which are adapted to receive the set screw 39, so that by adjusting a bar in the sockets 33 and tightening the set screws 39, the length of the cross-bar can be accurately regulated.

As shown in Fig. 6 the shoulders 36 of the bracket abut with the inner edges of the rails 35ª, thus preventing rattling, and as shown in Figs. 5 and 8, the cross bars 32 are lengthened so that the outer ends of the members 35 abut with the sides of the rails 35ᵇ.

In Figs. 5 and 8 I have shown the bed made up of two parts A, each having two longitudinal bars 20, while in Figs. 1 and 6 the bed is full size, and has three bars 20, but the structure is exactly alike in both cases, the only difference being in the width.

I have shown and described a bed adapted for ordinary sleeping purposes, but it will of course be understood that the structure described is equally applicable to car seats, chairs, automobile seats, couches, and analogous structures.

I claim:—

1. A spring bed having a top formed of flexible jointed parallel straps, with longitudinally extensible springs spaced apart from the ends of the bed and forming a part of said straps, a bottom formed of similar straps to the top but with longitudinally extensible springs of greater strength than the springs in the top straps, and spring members connecting the top and bottom of the bed.

2. A spring bed having a top formed of flexible straps with longitudinally extensible springs forming a part of the straps and spaced apart from the end portions of the bed, a bottom having flexible straps like the top straps and with extensible springs forming part of said bottom straps and spaced apart from the end portions of the bed, the springs of the bottom straps being of greater strength than those of the top straps, means for adjusting the tension of the springs in the bottom straps, and spring members connecting the top and bottom straps.

3. A spring bed having a top formed of parallel flexible straps with extensible springs forming a part of said straps, a bottom spaced apart from the top and formed of flexible straps having extensible springs therein forming a part of said straps, the bottom springs being of greater strength than the top springs, turnbuckles in the bottom straps for adjusting the tension of said bottom springs, and spiral springs connecting the top and bottom straps.

4. A spring bed comprising end frames each having brackets spaced apart and provided with laterally extending ledges near the top and bottom, angle rails connecting the several ledges on each of the end brackets, longitudinal bars connecting the lower portions of the end frames, a top formed of flexible parallel straps having extensible spring members therein, said straps being secured to the top rails of the end frames, a bottom formed of flexible parallel straps connecting the bottom rails of the end frames, the bottom straps having extensible springs therein of greater strength than the top springs, and spiral springs connecting the top and bottom straps of the bed.

5. The combination with the bed spring having longitudinal supporting bars near the bottom thereof, of brackets having seats thereon to receive the outer bars of the bed, ledges to rest on the rails of the bed, sockets on their inner sides, and a cross bar entering the aforesaid bracket sockets and adapted to support the middle longitudinal bars of the bed.

6. The combination with the bed having longitudinal bars on the under side, of cross supports to fit the rails of a bedstead and support said longitudinal bars, each cross bar comprising end brackets having on the upper side seats to receive the outer longitudinal bars of the bed, flanges to rest on the bed rails, sockets open at the inner ends, and a member having a raised middle portion and connecting the opposite brackets.

7. The combination with the bed having longitudinal bars beneath, of supports to carry the bed on a bedstead, each support comprising opposed brackets having seats on the upper side for the outer longitudinal bed bars, flanges at the outer ends to rest on the bed rails, sockets on the inner sides, a cross bar entering the sockets of the opposite brackets, and means for adjusting the brackets on the cross bar.

8. The combination with the bed having longitudinal bars on the under side, of cross supports to connect the bed with the bedstead, each support comprising opposed brackets having seats on the upper side to support the outer longitudinal bars of the bed, flanges to rest on the bed rails, sockets on the inner sides, a cross bar entering the sockets of the opposed brackets, and shoulders on the brackets to abut with the rails of the bedstead.

9. A spring bed comprising a top and bottom portion spaced well apart at the ends, thereby bringing said top and bottom portions into generally parallel relation throughout their extent, longitudinally extensible springs spaced apart from the bed ends and forming a part of the top portion, said springs forming the sole connection between separated sections of the top, the bottom portion having similarly arranged springs to the top but of greater strength, and spring members arranged between the top and bottom portions.

JULIUS ROEVER.

Witnesses:
 WARREN B. HUTCHINSON,
 ARTHUR G. DANNELL.